Figure 1:
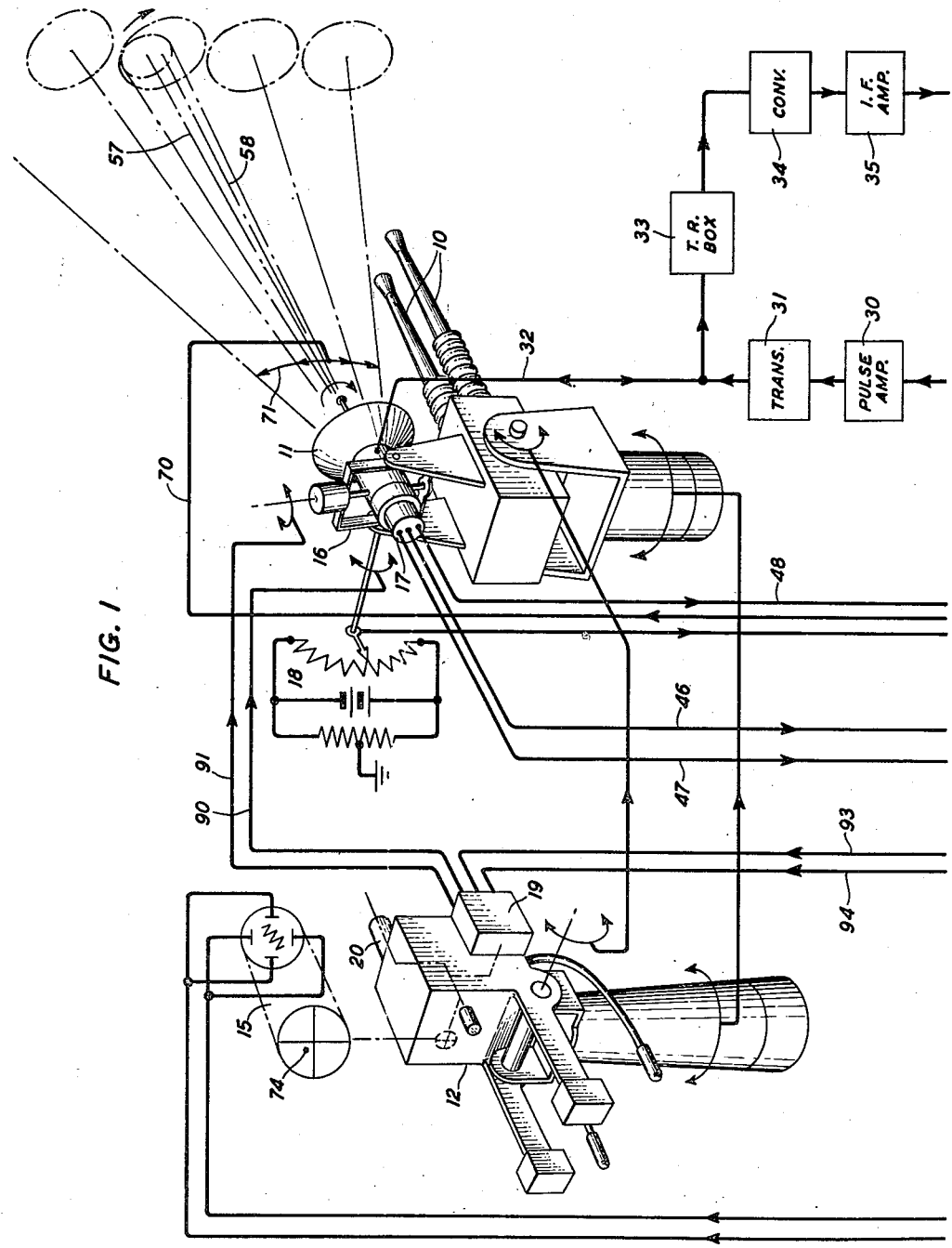

Oct. 20, 1953    E. E. CRUMP    2,656,532
RADAR SYSTEM
Filed Oct. 23, 1946    3 Sheets-Sheet 1

INVENTOR
E. E. CRUMP
BY E. V. Griggs
ATTORNEY

Oct. 20, 1953  E. E. CRUMP  2,656,532
RADAR SYSTEM
Filed Oct. 23, 1946  3 Sheets-Sheet 2

INVENTOR
E. E. CRUMP
BY E. V. Griggs
ATTORNEY

Oct. 20, 1953     E. E. CRUMP     2,656,532
RADAR SYSTEM

Filed Oct. 23, 1946                       3 Sheets-Sheet 3

INVENTOR
E. E. CRUMP
BY
ATTORNEY

Patented Oct. 20, 1953

2,656,532

UNITED STATES PATENT OFFICE 2,656,532

RADAR SYSTEM

Elmo E. Crump, East Orange, N. J., assignor to Bell Telephone Laboratories, Incorporated, New York, N. Y., a corporation of New York Application October 23, 1946, Serial No. 705,024

9 Claims. (Cl. 343—11)

This invention relates to a radar system, and particularly to a system and method adapted to simplify and speed up the process of acquiring and utilizing all of the positional data necessary for the purpose of getting on-target quickly and systematically.

A portion of the subject-matter disclosed in this application is being claimed in divisional application Serial No. 291,437, filed June 3, 1952.

Primarily the positional data needed as to a target in gun pointing include the range of the target and its position in bearing and in elevation. Where the object is moving at a high speed, as in the case of attacking aircraft, this positional data, in order to be effective, must be obtained and utilized in a very brief interval of time, ordinarily in the order of a few seconds. The system of the present invention is so designed and organized that this may be accomplished with a high degree of regularity and certainty.

It frequently has been the practice in prior systems of this general character to distribute different phases of the operation of target acquisition and gun pointing among a number of operators in such a way as to require a degree of coordinated and cooperative effort difficult to attain and inconsistent with speedy operation. One of the primary objects of the present invention is to secure the presentation of all significant target data at a single position, and preferably upon an indicating device before a single operator, so that that operator may exercise complete control over the pointing of the gun and of the associated antenna throughout the entire preliminary or search period and up to the time when the gun director or fire control operator takes over for final tracking.

Furthermore in fire control systems of this sort the presentation of target indications on the oscilloscope screen with respect to bearing or elevation frequently has been ambiguous and not well adapted for accurate and speedy interpretation, either on account of the distribution of the indications upon several separately located indicating devices or oscilloscopes, or on account of inherent ambiguity in the signal itself. It is a further object of the present invention to eliminate such ambiguity and to speed up target position determination or "acquisition" by presenting all target data upon a single oscilloscope, and by providing means for converting by means of visual differentiation an otherwise ambiguous into an exact indication of target position.

In realizing the above and other objects that will be pointed out hereinafter, the present invention provides for the presentation at a single operator's position and upon a single oscilloscope screen of the target indications resulting from the impulse transmitting and echo receiving action of a narrow angle directive scanning beam of approximately circular cross-section that is caused continuously to rotate rapidly about an axis, the antenna axis being eccentric to the beam axis and lying within the beam area, and the beam being caused continuously to nod or oscillate through a controllable angle about a mean nodding axis in one of the dimensions of bearing and elevation and at the same time progressively advance in the other dimension. Preferably, the oscillation or nod of the directive beam is in elevation and the progressive advance is in azimuth or bearing. In accordance with this invention the transmitted impulses and received echoes are subjected to a lobe switching action that causes all of the echoes received from impulses transmitted during corresponding half-rotations of the beam to produce oscilloscope indications that are slightly displaced laterally from the indications resulting from echoes received from the same target produced by impulses transmitted during the corresponding opposite half-rotations of the beam. The position of these paired indications along one dimension of the oscilloscope screen, preferably the horizontal dimension, indicate the range of the target producing the indications, and equality of magnitude and brilliancy of the two indications of the pair indicate coincidence in bearing of the target with the antenna axis. The position of the paired indications in the other dimension of the screen, preferably the vertical dimension, indicate the position of the target in elevation. The target acquisition operator, at whose station the oscilloscope screen is located, is provided with means for continuously translating the acquired positional data into a signal at the position of the gun fire director operator, under whose control, guided by the signal, the means scanning axis is moved in bearing and elevation and centered upon the target, a condition the attainment of which is indicated to the acquisition operator by the centering in the vertical dimension of the equalized paired indication of the selected target. The angle of nod is then reduced to facilitate the determination of the range of the selected target, indicated by the movement of the range lines to coincide with the paired target indication. When this occurs the nodding is stopped with the antenna axis in its mean position, the target having been spotted with a degree of accuracy sufficient to bring it within the range of the precision operations thereafter under the control of the gun fire director operator.

Prior to the time when, in the search operation, a target is presented on the acquisition operator's oscilloscope screen as paired signal indications, it may appear as a single indication. Inasmuch as a paired, rather than a single, indiction is required for precise determination of a target in bearing, the presentation of a target indication as a single line is ambiguous as to the direction in which the antenna axis must be moved in bearing to establish the exact position of the target. The present invention provides means whereby such ambiguity is avoided by affording visual differentiation between signals resulting from left lobe echoes and right lobe echoes over the continuously rotating directive scanning beam. Preferably such visual differentiation is a color differentiation secured by the interposition between the eye and the oscilloscope screen of means, such as a sector disc, synchronized in its movement or rotation with the right and left lobe switching of the rotating directive beam. This causes single indication right lobe signals to appear to the eye as of one color and left lobe single indications to appear as of another color. The target acquisition operator is thus provided with information immediately upon the appearance of the single indication as to which direction the antenna axis must be moved to cause it to produce paired indications and coincide with the corresponding target. Thus, the length of time necessary to acquire a target after it has been designated may be further reduced.

Figure 2:
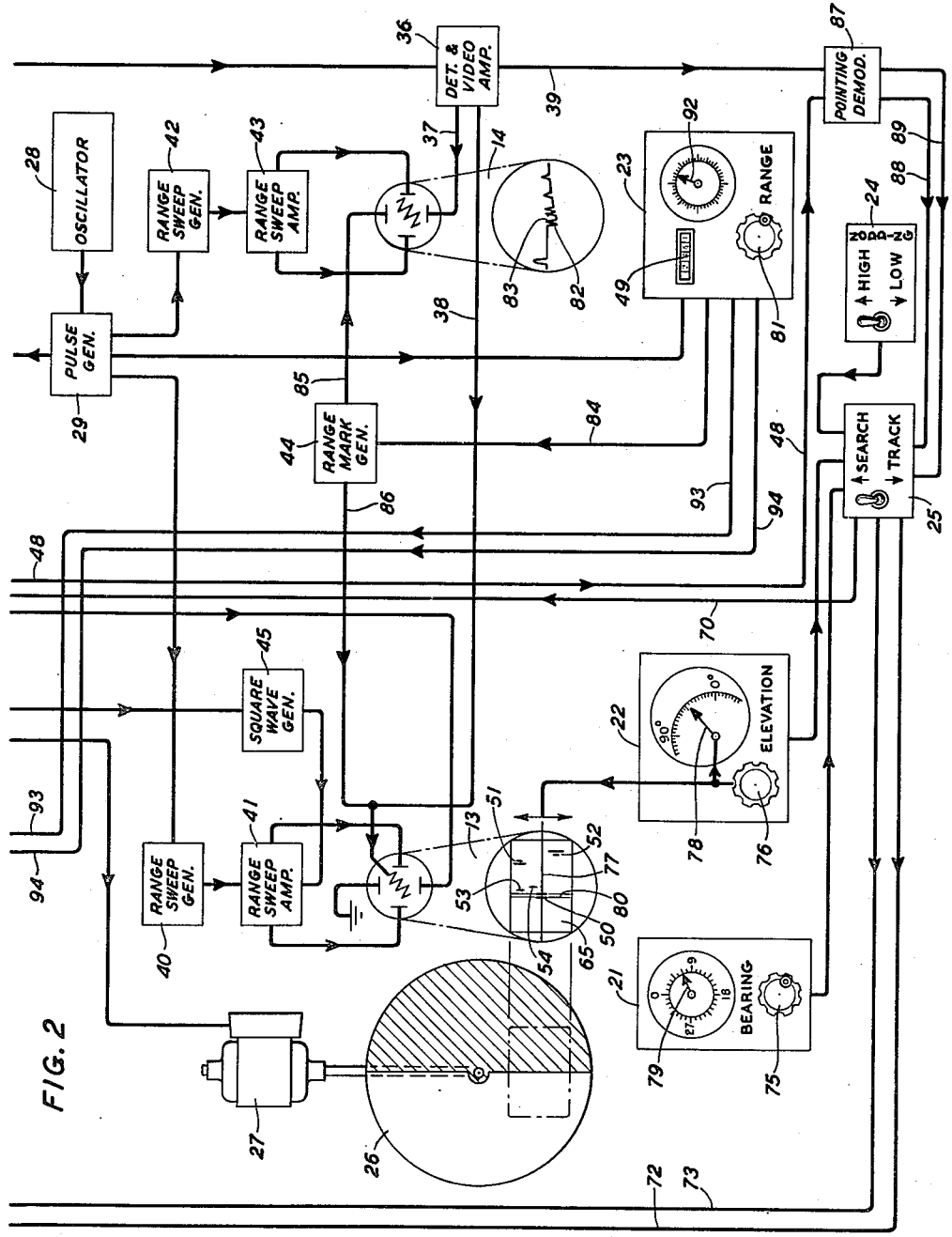
Figure 3:
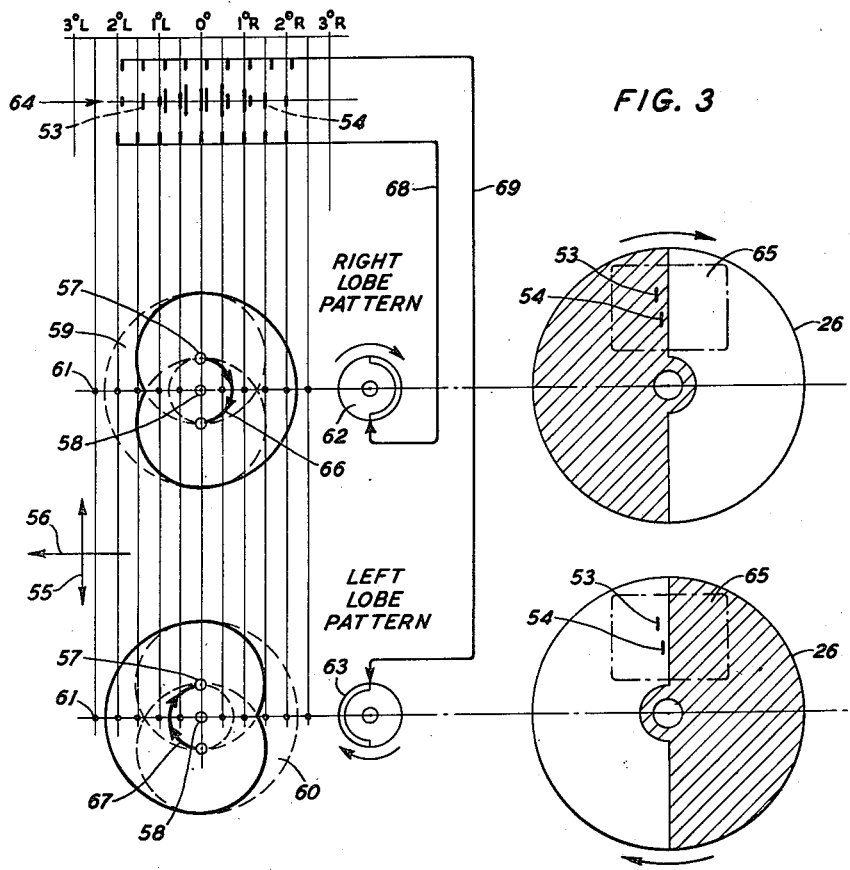

The preferred form of radar system embodying the various features of the present invention may be more fully understood by reference to the following description taken in connection with the drawings, in which:

Figs. 1 and 2, taken together, with Fig. 1 arranged above Fig. 2 in position to match the functional connecting lines, constitute a schematic illustration of the entire system; and Fig. 3 is a schematic illustration of the manner in which the target signal indications are formed by and related to the lobe switching patterns of the rotating directive beam, and also the relation between the patterns and their resultant signal indications and the rotating sector disc that produces visual differentiation between right lobe and left lobe target signals.

Referring now to the drawings, a preferred form of the system of the present invention is disclosed in the functional block schematic diagram of Figs. 1 and 2. As indicated, the apparatus of the organization is centered generally in three operation control positions, namely, the gun and antenna position, the gun director position and the target acquisition and radar control position. At the gun position are the twin guns 10 and the radar antenna 11; at the gun director position is the pedestal type one-man director 12; and at the target acquisition and radar position are located the target acquisition and radar oscilloscopes 13 and 14 together with the various controls provided for manipulation by the operator or operators at this position in response to the target indications presented upon the oscilloscopes. Generally stated, the operational relationship between these three positions is one in which the pointing of the guns at the gun position is under the complete control of the fire control operator at the gun director position, which operator in turn performs his functions, as to radar identified targets, under the guidance and control of a signal electrically communicated to the gun director position from the controls at the target acquisition and radar position.

The lines extending between the schematically shown apparatus elements located at the various positions as well as the lines extending between the block schematic representations of elements of the system, indicate merely the functional control exercised by one element or piece of apparatus over another. The exact manner in which these controls between elements are exercised are well understood by those skilled in the art to which the present invention relates, and it is though sufficient for the purposes of the present disclosure to indicate them merely schematically.

In the particular system shown in Fig. 1 in connection with which the preferred embodiment of the present invention is disclosed, the radar antenna 11 is directly mounted upon the twin guns 10 and partakes of their movement. It is also capable of independent movement with respect to its gun carried support, as will hereinafter be described. As indicated, the structure upon which the guns 10 are mounted is capable of being swung in azimuth or bearing about a vertical axis, and in elevation about a horizontal axis. These rotational movements are effected by well-known servo mechanisms under the control of the gun director 12, the functional connections between the gun director and the gun mount, as indicated by the lines terminating at each end in double-headed circular arrows, being such that as the gun director 12 is moved in bearing and elevation, the guns 10 have imparted to them exactly corresponding angular movements. The movement of the gun director 12 by the gun director operator is effected through the medium of the rearwardly extending handle bars on the director. The movement of the director and consequent corresponding movement of the guns is a result that automatically follows the gun director operator's performance of his function of keeping the spot 74 representing the target constantly centered upon the cross-hairs or the reticle of the oscilloscope 15 mounted upon and forming part of the director. The manner in which the position of the spot on the screen of oscilloscope 15 is controlled by the position of the target will be described hereinafter.

The antenna 11 mounted upon the gun support is preferably of the front feed paraboloid reflector type disclosed in the application of Cassius C. Cutler, Serial No. 518,377, filed January 15, 1944, now Patent No. 2,422,184, granted June 16, 1947, the front feed or primary antenna portion being rotated about the focus of the paraboloid reflector to generate a conical scanning field as disclosed in the application of Edward H. Karleen, Serial No. 603,991, filed July 9, 1945, now Patent No. 2,457,562, granted December 28, 1948. In the preferred embodiment of the invention herein disclosed the wavelength of the radiated wave and the effective reflector dimensions are so chosen as to generate a directive scanning beam approximately circular in cross-section and three degrees in width at the half-power point; and the radius of rotation of the feed about the reflector focus is such as to cause a rotation of the three-degree scanning beam on a three-quarter degree radius about the antenna axis to produce a lobe-switching beam shift of approximately 1.5 degrees. As a result the rotating beam has an over-all width or coverage of about 4.5 degrees.

The support of the antenna 11 upon the gun mount is through the medium of a gimbal frame 16. The horizontal axis of the frame gives the antenna freedom of movement in a vertical plane, and associated mechanism (not shown) causes the antenna during the search operation continuously to oscillate or nod uniformly in the vertical plane through a controllable angle about a mean position and at the end of the search operation to be brought to rest at the center of the nod with the antenna axis in alignment with the gun axis. Throughout the search operation therefore the antenna automatically continues to scan a sector having a breadth equal to the effective breadth of the rotating directive beam and having a height equal to the vertical angle of the nod about the nodding center of the antenna. The center of the automatically scanned sector in bearing and elevation during search is determined by the position in bearing and elevation of the gun mount as controlled by the gun director 12.

The rotation of the directive scanning beam is effected by a motor which in the present embodiment of the invention rotates and drives the rotating antenna front feed at the rate of 30 cycles per second; and this motor drives a two-phase 30-cycles per second generator, schematically indicated at 17, for supplying controlling voltages to other elements of the organization. The above-mentioned motor and generator form part of the antenna housing structure mechanically supported by the gimbal frame 16. Another element, schematically indicated at 18 as a potentiometer, is controlled by the nodding movement of the antenna to furnish voltages in proportion to the nodding angle to the vertical sweep circuit of the acquisition operator's oscilloscope 13.

The gun director 12 is represented as being arranged to be swung vertically upon a horizontal axis and horizontally upon a vertical axis through the medium of handle-bars grasped by the gun director operator. As has been stated, these vertical and horizontal angular movements of the gun director are translated into exactly corresponding angular movements of the mounting of the guns 10. The manually operated director 12 is provided with means for effecting both optical and radar tracking of the target. The optical elements of the system are suggested by the barrel 20 of a telescope projecting from the front of the director, and the radar elements by the oscilloscope 15 which, for clarity of representation, is indicated as merely associated with rather than mounted inside the director housing. The director 12 is also provided with a computer and gun sight control 19, indicated as mounted upon the side of the director housing, which functions in response to various data communicated to it to control the angular alignment of the radar antenna 11 in such a way that the radar beam, as well as the optical line of sight of the director, remain directed at the present target position while the guns are being aimed at the future target positions.

At the position at which the target acquisition operator is stationed are the two oscilloscopes 13 and 14, together with the elements 21, 22 and 23 through the medium of which the bearing, elevation and range, respectively, of a target are ascertained and this positional target information employed to direct the pointing of the guns through the medium of the director 12 and associated computer 19. At this position there are also located a switch 24 for controlling the angular amount of automatic nod of the antenna 11 and a switch 25 for shifting the operation of the system from search to track. Also at this position there may be located a sector disc 26 driven by a motor 27 for enabling the operator to ascertain by visual differentiation the direction in bearing of a target that appears on the oscilloscope screen as a single rather than a paired indication.

As shown schematically the radio pulse energy transmitting portion of the system includes the oscillator 28, pulse generator 29, pulse amplifier 30 and transmitter 31, from the latter of which the pulses of radio frequency energy are transmitted over the path 32 to the rotating front feed of the antenna 11 and, after reflection by the parabolic reflector of the antenna, are projected as a narrow conical beam. The echo from a target in the path of the beam is reflected back over the directive beam to the antenna and thence passes over the path 32 to the receiving elements which are schematically represented as including the TR or transmit-receive box 33, converter 34, intermediate frequency amplifier 35, and detector and video frequency amplifier 36 to the echo or reflected pulse control elements of the oscilloscopes 13 and 14 at the position where the target acquisition operator is stationed. Certain of the received pulse energy also passes by way of the search-track switch 25 when the switch is in its lower position to the elements of the oscilloscope 15 associated with the director 12.

Somewhat more specifically with respect to the above-mentioned elements, the function of the pulse generator 29 is to establish, under the control of the oscillator 28, the pulse repetition rate of the system, and to supply the necessary synchronizing and keying pulses to the other units. The transmitter 31 is keyed by pulses from the pulse generator 29, amplified by the pulse amplifier 30, which in turn produces pulses of radio frequency energy of very short duration. The pulse repetition rate in the present system may conveniently be nominally 1,800 per second, and the pulse duration may be a fraction of a microsecond. These pulses from the transmitter 31, which may include a magnetron, are supplied over the path 32 to the antenna 11. The TR box 33 operates to protect the receiving equipment while each pulse is being delivered to the antenna by the transmitter 31 and is restored immediately after the pulse so as to permit the returning echoes from the pulse to flow into the receiving circuit.

The returning echoes of ultra-high frequency are demodulated to an intermediate frequency by the converter 34, which preferably employs a crystal detector and a beating oscillator, and the intermediate frequency, after amplification in the intermediate frequency amplifier 35, passes to the detector and video frequency amplifier 36 where the final demodulation and amplification of the target signal takes place. From the unit 36 the target signal is transmitted over path 37 to the radar oscilloscope 14, over path 38 to the target acquisition oscilloscope 13, and over path 39 to the pointing demodulator 87.

The horizontal or range sweeps of the oscilloscopes 13 and 14 are keyed by the pulse generator 29. The keying pulse for the acquisition oscilloscope 13 controls the range sweep generator 40 to produce an appropriately shaped voltage wave which is amplified in the range sweep amplifier 41 and applied to the horizontal sweep plates of the oscilloscope 13. The keying pulse for the radar oscilloscope 14 controls the range sweep generator 42 to produce an appropriately shaped voltage wave which is amplified by the range sweep amplifier 43 and applied to the horizontal deflection plates of the oscilloscope 14.

The vertical deflection plates of the acquisition oscilloscope 13 are under the control of voltages supplied from the potentiometer 18 associated with the antenna 11, which as previously mentioned vary proportionately with the angle of the antenna nod. The vertical deflection plates of the radar oscilloscope 14 serve, under control of the signals received over path 37, to produce the target indicating pips or vertical deflections along the horizontal trace of the cathode ray beam, and also, under the control of the range mark generator 44, to produce a vertical deflection along the horizontal trace, the position of which deflection is controlled by the range unit 23 to identify the position in range of an acquired target. The position in range of the same target is at the same time indicated on the acquisition oscilloscope 13 by virtue of the control of the range mark generator 44 over the intensity grid of the oscilloscope 13. In the latter case each pulse from the range mark generator increases the brilliancy of each horizontal trace of oscilloscope 13 at a point along the horizontal or range trace that corresponds to the setting of the range unit 23 and thus appears as a vertical line on the screen.

The horizontal or range trace of the acquisition oscilloscope 13 is, further, under the control of the two-phase 30-cycle generator 17 forming a part of the antenna unit through the medium of the square wave generator 45 connected with the generator 17 over path 46. During each of the successive corresponding series of alternate half-cycles of rotation of the generator 17, directly coupled with the motor that rotates the antenna feed, the square wave generator applies through the range sweep amplifier 41 a voltage to the horizontal deflection plates of acquisition oscilloscope 13 that slightly displaces the origin of the horizontal or range sweep. The purpose of this is to cause each target when it is close to the axis of rotation of the directive beam to produce a paired rather than a single indication on the oscilloscope screen.

The two-phase generator 17 of the antenna has functional connection over path 47 with the driving motor 27 of the color differentiating sector disc 26, which disc is thereby driven in synchronism and phase with the rotating antenna feed. Another functional connection of the generator 17 extends by way of path 48 to the pointing demodulator 87 to which the target signal is also applied by way of path 39. The signal and the wave from generator 17 are here intermodulated to produce pointing voltages that are conveyed over paths 88 and 89 to the director oscilloscope 15 by way of the search track switch 25 when the switch is moved to its lower or track position.

At the position where the target acquisition operator is stationed the target data obtained through observation of the oscilloscopes 13 and 14 are utilized to bring about the pointing of the guns 10 through the medium of controls associated with the bearing unit 21, the elevation unit 22, the range unit 23 and the associated switches 24 and 25. During the search stage of the operation the acquisition operator's control of the gun pointing is through the medium of the operator of the director 12, constantly guided by the wandering spot 74 on the director oscilloscope 15 as determined by controls manipulated by the acquisition operator. During the tracking stage of the operation the control exercised by the director operator over the pointing of the guns continues to be under the guidance of the position of the spot 74 in oscilloscope 15, subject to corrections automatically introduced by the operation of the computer 19 forming part of the gun director. But during this stage of the operation the position of the wandering spot on oscilloscope 15 is under the direct control of the target signal rather than under the intermediate control of the acquisition operator.

As has been stated, the acquisition of the target is effected by the operator under the guidance of the target patterns presented upon the screens of the oscilloscopes 13 and 14. The pattern presented on the screen of oscilloscope 14 is a conventional so-called A presentation in which the trace of the cathode ray is a single horizontal trace diametrically across the screen, the origin of the trace being identified by the vertical deflection of the trace at its extreme left-hand end, and the target signals being identified as vertical deflections lying along the trace between the two ends. The distance along the trace from its origin to the target deflection or pip 83 is proportional to the radial distance in space between the antenna and the corresponding target. The abrupt depression 82 in the trace just short of the target indication is the so-called "step" movable along the trace under the control of the range unit 23, which through the counter 49 on the range unit indicates the distance, usually in yards, to this target or any other target to which the step is advanced. The A presentation of the oscilloscope 14 presents merely range data, and gives no information as to the position of the target in elevation or in bearing.

The double-B or paired presentation of target signals on the oscilloscope 13 presents upon the same screen all of the positional data necessary for the determination of the elevation and bearing of a target as well as its range. The B type of presentation is one in which the reflected signal or echo from the target produces an increase in luminous intensity rather than a deflection of the trace. The range or distance to any given target is represented by the distance along the trace to the point of greater luminosity. The vertical deflection plates of an oscilloscope, such as 13, giving a B type of presentation, are employed to distribute the luminous range indications of the targets vertically over the face of the screen, in the present case in accordance with the elevation angle of the directive beam at the instant the target echo is received.

On the screen of the acquisition oscilloscope 13 as shown in Fig. 2 five target indications 50, 51, 52, 53 and 54, are represented. Of these, 50, 51 and 52, are paired indications, showing that the corresponding objects or targets lie sufficiently close to the antenna axis to fall within the conical area defined by the rotating beam during all phases of its rotation about the antenna axis. 53 and 54 consist of single or unpaired indications, showing that the objects or targets they represent are far enough off the axis of rotation of the directive beam so that they receive and reflect pulses during only one-half or the other of the cycle of rotation of the beam. These signals are all produced by the brightening of the horizontal range trace of the cathode ray at a point along the trace with reference to its origin corresponding with the time interval between the transmitted pulse and the return of the echo. This distance along the trace constitutes a measure of the distance of the object from the antenna in space. Thus, it may be seen that the target represented by the paired indications 50 is the closest, followed in order by the more remote targets represented by the indications 53, 54, 51 and 52. As the range sweep or trace is caused to move vertically up and down over the oscilloscope screen in proportion to the angular nod of the antenna about its nodding center the vertical positions of the indications show that in elevation the target represented by the indication 50 is at the angular center of the nod, and that the targets represented by the other indications are above or below the nodding center by amounts in elevation corresponding to the vertical distances of the associated indications from the center of the screen. The advantage in search of having indications representing several targets within the same area simultaneously visible on the screen is secured by choosing a screen having an effective phosphor persistence related to the length of the vertical scanning cycle, and preferably somewhat greater than the length of the cycle.

The amounts by which a target having a paired indication on the screen is off in bearing with respect to the antenna axis is indicated by inequality in length and brightness of the two lines of the pair. Actually, each line consists of a vertical series of dots of less or greater brightness, each dot representing an individual echo reflected from the target as the directive beam sweeps over it, the vertical arrangement of these dots with respect to each other being due to the continuous vertical displacement of the successive cathode ray traces in correspondence with the angular movement in elevation of the directive scanning beam, and the brightness of the spots forming the line being in proportion to the position of the target in relation to the maximum power axis of the directive beam itself.

The relation between the position of a target with respect to the phase of rotation of the scanning beam and the nature of the resultant pattern produced on the oscilloscope screen may be better explained by reference to Fig. 3 of the drawings. As previously stated, the scanning beam during the search stage in the operation of the system is simultaneously executing three sorts of movements, namely, a rapid continuous rotation of the narrow circular cross-section beam about the antenna axis, a uniform nodding movement of the rotating beam over a relatively large angle in elevation, and a progressive advance in bearing of the nodding and rotating beam. The rate of the progressive advance in bearing of the nodding rotating beam is made such, if automatic, as to cause an overlap in bearing of the areas covered by the beam in its successive nods in elevation so that no portion of the search area will be skipped. In Fig. 3 the movement of the beam in elevation and bearing is indicated by the arrows 55 and 56, respectively. As to rotation, the axis 57 of the beam is indicated in the figure as rotating about the antenna axis 58, the antenna axis lying within the beam cross-section and eccentric to the beam axis.

As the effective diameter of the beam in the present embodiment of the invention has been assumed to be three degrees and as the eccentricity of the beam axis with respect to the antenna axis has been assumed to be three-quarters degree, the complete coverage of the beam during each cycle of rotation is represented by a circle four and one-half degrees in diameter. But on account of the eccentricity of the axis of rotation, that is, the antenna axis, with respect to the beam axis, it follows that during each of the two half-cycles of rotation 66 and 67 in which the beam is on one side of the antenna axis, there is a certain area on the opposite side of the axis within which the beam is ineffective to transmit impulses to and receive echoes from targets lying within that area. Target reflections are received from this area only when the beam is in the half-cycle of its rotation in which the area lies. These are the areas lying between the full and broken lines designated 59 in the upper pattern representing the right lobe half-cycle rotation 66 of the scanning beam and 60 in the lower pattern representing the left lobe half-cycle rotation 67 of the scanning beam. Targets lying at all other points within the scanning beam pattern are within the effective areas of both lobes. Therefore echoes are returned from them in both lobe positions, and thus throughout the complete cycle of rotation of the beam.

All of the echoes, whether right lobe or left lobe, produce luminous indications on the oscilloscope screen. But the arrangement is such that the left lobe and right lobe indications are displaced laterally on the screen with respect to each other, and thus may be utilized to inform the acquisition operator which direction in bearing the antenna axis must be moved to cause it to approach and coincide with the target from which the echoes are being reflected. The manner in which this is done is schematically illustrated in Fig. 3.

It is assumed that a target 61 initially lying two and one-half degrees to the left of the antenna axis 58, as indicated by the scale at the top of the figure, moves diametrically across the beam pattern and through the antenna axis to a position two and one-half degrees to the right of the antenna axis. During this movement of the target 61 with respect to the beam, the beam is rotating about the antenna axis at the assumed rate of 30 cycles per second, half of each cycle of rotation constituting the right lobe pattern of the beam, and the other half-cycle constituting the left lobe pattern. Associated with each pattern is a device 62, 63 schematically shown as a commutator, but actually the elements of the system that are shown in Figs. 1 and 2 as the two-phase, 30-cycle generator 17 at the antenna and the connection of this generator through the square wave generator 45 and the range sweep amplifier 41 to the horizontal deflection plates of acquisition operator's oscilloscope 13.

The varying kinds of indication produced on the oscilloscope screen by the advance of target 61 through the scanning beam are represented at 64 in Fig. 3, and the control of the lateral displacement of the target indications on the screen in accordance with whether the rotating beam is in its right lobe or left lobe position is represented as functional connecting lines 68 and 69 extending from the commutator 62 and 63, respectively, and terminating in vertically extending stubs, each of which is in vertical alignment with the position of the indication produced on the screen when the beam is in the corresponding right lobe or left lobe phase of its rotation. As suggested by the schematic illustration, all left lobe indications are slightly displaced on the screen to the right with respect to the indications from the same target produced when the beam is in its right lobe position.

When the target 61 is in the first of its successive positions at two and one-half degrees to the left of the antenna axis, no indication is produced on the screen, as the target is entirely outside of the coverage of the beam, whether in its right lobe or left lobe position. When the target has advanced to two degrees left of the antenna axis, no right lobe indication is produced, as the target lies in the inactive area 59 of the right lobe pattern. But as the rapidly rotating beam swings into its left lobe position, the target at two degrees left comes within the active portion of the beam with the result that an indication in the form of a single short line is produced on the screen. When the target has advanced to one and one-half degrees left it is still within the inactive area 59 of the beam in its right lobe position, but is within the active area of the beam in its left lobe position and therefore still appears upon the screen as a single or unpaired indication. But the single line indication has become longer and brighter, as the target in this position is intersected by a greater length of the active area of the left lobe pattern of the beam, and has advanced deeper into the power area of the beam.

When the target has advanced to one degree left of the antenna axis it has reached a point where it is in the active area of the beam in both the right lobe and left lobe positions. Therefore the corresponding indication becomes a paired indication on the screen. However, as the target has just entered the active area of the right lobe pattern of the beam, but has advanced well within the active area in the left lobe pattern, the right lobe line at the left of the pair is shorter and fainter than the left lobe line at the right of the paired indication.

As the target continues its advance toward the right, the right lobe line at the left of the pair increases in length and brightness, while the left lobe line at the right of the pair, after reaching a maximum length and brightness at a point at one-half degree right where the target is intercepted by the most effective area of the beam in its left lobe position, diminishes in length and brightness until it finally disappears when the target has moved to a point one and one-half degrees right of the antenna axis and therefore is within the ineffective area 69 of the beam in its left lobe position. But at this point the target is still within the effective area of the beam in its right lobe position and therefore appears as a single line indication on the screen. At two degrees right the single right lobe indication of the target has become shorter and fainter, and has disappeared entirely when the target has moved to two and one-half degrees right of the antenna axis.

The target indications are either single line indications or paired indications with the lines of unequal length and brilliancy at all positions of the target except that at which it coincides with the antenna axis. At this zero position the target is past the maximum power position with respect to the effective left lobe area of the beam and is approaching the maximum power position in the right lobe effective area of the beam.

When the diminishing left lobe indication and the increasing right lobe indication become equal in length and brilliancy, the target lies in bearing at the antenna axis.

The showing of the target indications 64 of Fig. 3 as disposed at different points horizontally is merely for convenience in description. It will be understood that the location of the target indication along the horizontal dimension of the oscilloscope screen is determined by the position of the target in range, and as long as the range remains the same the target indication remains at exactly the same range or horizontal position on the screen. In the illustrative instance that has been described in connection with Fig. 3 the appearance upon the oscilloscope screen would be that of a gradually changing pattern at a single point on the screen as the direction of relation of the rotating antenna beam with the target changes in bearing. At this point there would first be a faint single line gradually increasing in length and brightness, then becoming an unequal paired indication, and then becoming an equal paired indication as the antenna axis coincided with the target—but all at the same point on the oscilloscope screen.

As has previously been mentioned, the lateral displacement of the two portions of the paired target indication with respect to each other is effected by laterally displacing the origins of the oscilloscope range sweeps that occur either during all of the right lobe positions or all of the left lobe positions of the scanning beam. In the arrangement illustrated in Fig. 3 the sweep regions are shown as being displaced toward the right during all left lobe positions of the beam. This results in positioning the left lobe indications at the right of each pair and the right lobe indications at the left of each pair. The consequence is that moving the beam in bearing in the direction of the weaker indication of the pair increases the magnitude of the weaker indication, decreases the magnitude of the stronger indication, and thus is a movement in the right direction to bring the axis of the antenna into coincidence with the target in bearing.

Fig. 3 also illustrates schematically the manner in which visual differentiation is employed in identifying the direction in bearing from the antenna axis of a target indicated on the oscilloscope screen merely as a single line, and thus informing the acquisition operator the direction to move the antenna in order quickly to acquire the target. The position of a sector disc 26 with reference to the screen 65 of the acquisition oscilloscope 13 is shown for each of the two lobe positions of the scanning beam illustrated in the left-hand portion of Fig. 3. Two ambiguous single line indications 53 and 54 are shown on the screen 65. For the purposes of description it may be assumed that 53 is a left lobe target indication such as that shown to be produced when the target 61 is one and one-half degrees left of the antenna axis and that 54 is a target indication such as that produced when the target 61 is one and one-half degrees to the right of the antenna axis. The positions of these two indications on the screen indicate two targets at different elevations and with target 53 slightly closer in range than target 54. Being single, however, neither one of the indications when viewed directly conveys any information as to the direction in which the antenna axis must be moved to get onto the target in bearing. This information may be obtained by interposing the rotating sector disc 26 between the screen and the eye of the operator.

The sector disc may assume a variety of forms with respect to construction, dimensions, material employed, and proximity to the screen, but in the illustrative form here shown, it may be large, lie close to the screen and consist of a 180-degree sector of such material as amber-colored Vinylite, the remaining 180 degrees of the disc being either clear or entirely cut away. The broken lines connecting the axis of the disc, in each of the two phases of rotation in which it is shown, with the axis of the corresponding one of the commutators 62 and 63 of the right lobe position and left lobe position, respectively, of the rotating scanning beam indicate that in rate of rotation and phase the disc corresponds with the rate of rotation and phase of the scanning beam. In the upper representation the sector disc is shown in the position it occupies as the scanning beam starts the right lobe half of its rotation, and in the lower representation the sector disc 26 is shown in the position it occupies at the start of the left lobe half of the rotation of the scanning beam. The relationship therefore is such that as the scanning beam swings through its right lobe position the amber sector is interposed between the oscilloscope screen and the eye, and as the beam swings through its left lobe position the clear or cutaway portion of the disc is interposed between the oscilloscope screen and the eye.

If under these conditions it were assumed that the target indication upon the screen consisted merely of a series of instantaneous flashes of white light, target indication 54, which is an indication produced only while the scanning beam is in its right lobe position, would at all times during its production have the amber portion of the sector disc interposed, and would therefore appear to the eye as an amber-colored indication. Under the same assumption target indication 53, being produced only during the left lobe position of the scanning beam, would not be seen through an interposed color screen and therefore would impress the eye as a white indication. Thus, all left lobe indications would appear white and all right lobe indications would appear amber to the eye. In this way the operator would immediately know in which direction to move the antenna axis in bearing to cause it to coincide with the target producing the single line indication.

But in the oscilloscope actually employed with this color differentiating method for determining the bearing of a target appearing as a single line on the screen, the phosphor characteristics of the screen are such that the target indication consists of an instantaneous blue-white flash followed by an amber phosphorescence of relatively long persistence. Such characteristics, however, do not prevent the method of color differentiation described from being effective. The long persistence characteristic of the phophor causes the light of all target indications, whether right lobe or left lobe, or whether viewed directly or through the interposed amber color sector screen, to appear amber to the eye. But the instantaneous blue-white flash characteristic reaches the eye only in the case of the left lobe signals, the instantaneous flash of which always occurs when the color screen is not interposed. The instantaneous blue-white flash of the right lobe indications, on the other hand, always occur at a time when the color screen is interposed, and these right lobe indications therefore always appear amber. As the relative intrinsic brilliancy of the blue-white flash from left lobe target indications that reaches the eye directly is great, the consequence is that the left lobe target indications have a strong blue-white component that distinguishes them from the uniform amber color of the right lobe indications.

The above is upon the assumption that the phosphor of the oscilloscope screen has the characteristics mentioned. It is obvious that the principles of the color differentiation method described above, with suitable modifications of the color filtering action of the material of the sector disc, may readily be applied for use in connection with different types of oscilloscope screens having different characteristics. For instance, a phosphor adapted to emit white light during its persistent as well as its instantaneous excitation would permit the use of a sector disc having alternate sectors of blue and red, or any other color filter combination desired. But an arrangement such as that disclosed and described above has been demonstrated in actual operation to have the capacity for differentiating on a color basis between left lobe and right lobe otherwise ambiguous target indications, and thus for furnishing the acquisition operator with the information necessary to enable him to speed up the process of getting on target.

The operation of the system will now be described. This description will be directed merely to the particular operations that have a bearing upon the novel features that constitute or form a basis for the present invention. It will be understood that the entire system as schematically shown in the drawings embodies many features other than those toward which the claims of the present application are directed.

It will be assumed that the acquisition operator has been notified by telephoned instructions from the ship search system of the presence of a target to be acquired in an area generally designated as to bearing. In response to such instructions the acquisition operator, who has before him the indicating devices and controls illustrated in Fig. 2 of the drawing, thereupon moves switch 25 into its upper or search position and switch 24 into its upper or high nodding position. The movement of switch 24 into its upper position exercises over a patch 70 a control over the antenna 11 that causes it to commence automatically and continuously to nod through the greater of the two vertical angles indicated by the four-arrowed line 71 in which the functional control path 70 terminates at the antenna. The mechanism whereby this nodding is effected is not illustrated, as it is well known in the art. At the same time the motor within the housing of the antenna 11 is energized to rotate the antenna feed to cause the rotation of the axis of the directive beam 57 about the antenna axis 58.

When switch 25 is thrown to its upper or search position, it also functionally connects the bearing unit 21 with the horizontal deflection plates of the director oscilloscope 15 by way of path 72, and the elevation unit 22 with the vertical deflection plates of oscilloscope 15 by way of path 73. The spot 14 of the director oscilloscope 15 is now under the control, through the medium of synchro devices, of the bearing control knob 75 of unit 21 with respect to the horizontal position of the spot on the screen, and under the control of elevation knob 76 of unit 22 with respect to the vertical position of the spot on the screen. This control is such that voltages are applied to the horizontal and vertical plates of the director operator's oscilloscope proportional to the deviation between the angles in bearing and elevation in which the director 12, and therefore the guns 10 and antenna 11, points and the angles at which the bearing unit 21 and elevation unit 22 are set by the acquisition operator. Assuming that the spot 74 of oscilloscope 15 is initially centered on the cross-hairs as a result of the pointing angles in bearing and elevation of the director 12 coinciding with those at which the units 21 and 22 are set, then a different setting of units 21 and 22 in response to the target designation information received and the tracking operation that follows causes the spot 74 to move off of the cross-hairs' intersection both vertically and horizontally; and in recentering the spot by moving the director 12 in bearing and elevation, the director operator causes the pointing of the director, the antenna and the guns again to coincide with the angles in bearing and elevation to which the dials of the units 21 and 22 have been moved. Thus, through the control knobs 75 and 76 of the units 21 and 22 the acquisition operator has complete control of the pointing of the antenna and the guns through the medium of the director operator, acting as a "human servo," to keep the spot 74 centered on the cross-hairs of oscilloscope 15. The angle in elevation at which the pointer 78 of unit 22 is set by turning the elevation knob 76 establishes the angle of the center of nod of the antenna 11, and the nodding antenna is moved in bearings in accordance with the setting of pointer 79 of unit 21 by turning knob 75 of that unit.

As the antenna nods it projects pulses and receives echoes from any object lying in the sector determined by the vertical nodding angle and the breadth of coverage of the rapidly rotating narrow angle beam. The energy of the pulse echoes from any target in the scanned sector is applied, as has been described, to the grid of the acquisition oscilloscope 13 to control the intensity of the horizontal or range sweep at a point corresponding to the range of the target; and at the same time the range trace is being moved vertically over the screen of the oscilloscope proportionately to the angle of antenna nod under the control of voltages delivered by the potentiometer 18 associated with the antenna.

As the nodding and rapidly rotating directive beam is being moved in bearing under control of bearing knob 75 turned by the acquisition operator, let it be assumed, for example, that the single line target indication 53 appears on the oscilloscope screen in the position shown in Fig. 2. The instant the indication appears, the acquisition operator, by viewing the indication through the interposed rotating sector disc 26 is able, as described in connection with Fig. 3, to identify it as a left lobe indication on account of its blue-white appearance. Being a left lobe signal means that the target from which the echoes are being reflected lies to the left of the antenna axis. Therefore by turning the knob 75 of the bearing unit 21 to bring about, through the medium of the director operator, a movement of the antenna axis toward the left in bearing, the directive beam is moved so that the target now lies within both left and right lobes in the rotation of the beam, and therefore appears on the screen of oscilloscope 13 as a paired indication. The turning of the knob 75 has, in the meanwhile, caused the pointer 79 to indicate the bearing angle.

But the vertical position of the target indication on the screen shows that the target in elevation lies above the present center of the antenna nod. The means supplied to the acquisition operator for bringing the center nod of the antenna in alignment with the target is disclosed in the patent of C. W. Norwood, No. 2,407,019, issued September 9, 1947. Briefly, this comprises a horizontal cross-hair that can be moved vertically to any desired position on the screen from its normally centered diametrical position by pressing inwardly and turning the elevation knob 76. When the acquisition operator observes the indication 53 of the designated target he presses in and turns the knob 76 until the cross-hair 77 bisects the indication 53. The turning of knob 76 at the same time causes the pointer 78 to move in elevation the same number of degrees that the target 53 is above the nodding center of the antenna as represented by the normal position of the cross-hair 77. Upon releasing the knob 76 the cross-hair 77 immediately returns to its normal position. But the turning of the pointer 78 to the new position in elevation moves the spot 74 of director oscilloscope 15 off-center in elevation, and in recentering the spot the director operator moves the director, and therefore the guns 10 and the nodding center of the antenna 11, in elevation by an amount that is just sufficient to bring the center of the antenna nod in alignment with the target. These operations are usually performed in such a short interval that by the time the cross-hair 77 has returned to its normal diametrical position, the indication of the designated target has centered on the cross-hair.

As the target at this time has been brought within both lobe patterns of the rotating directive beam, the indication on the screen now consists of a paired indication. If there is inequality of length and brilliancy between the two lines of the pair, the acquisition operator brings about equalization by causing the antenna to move slightly in bearing in the direction of the weaker signal of the pair. For illustration, it may be assumed that target indication 53, now paired, centered and equalized, has become the signal designated 50. When this occurs the spot 74 of oscilloscope 15 is centered, the director 12, the guns 10 and the antenna 11 are aligned with the target in bearing and elevation, and the bearing angle and elevation angle are indicated by the pointers 79 and 78. The range determination of the target is also indicated on the acquisition operator's oscilloscope 13 when the paired range lines 80 coincide with the paired indication 50, as will be described.

The determination of the range of the acquired target is under control of the range unit 23. When the operator has acquired the target and caused the equalized indication to center on the hair-line 77, he throws the nodding control switch 24 into its low nodding position. This causes the amplitude of the nod to be reduced to a lesser angle, such as represented by the inner pair of arrows of the four-arrowed line 71, and causes the directive beam to sweep over the target more frequently. During the acquiring of the target at the acquisition operator's position in the manner described above, the target echo had also been received as a so-called A or deflection pattern on the oscilloscope 14 located in close proximity to the oscilloscope 13. Both oscilloscopes are within the range of observation of one operator; but it is customary to assign the acquisition oscilloscope 13 and its associated controls to the acquisition operator and the oscilloscope 14 and its associated controls to the radar operator, the two operators working as a team. When the target has been acquired in bearing and in elevation by the acquisition operator, that operator keeps the target centered in bearing and elevation while the radar operator, guided by the A pattern on the radar oscilloscope 14, proceeds to "gate" and determine the range of the target. For the purposes of the present description it will be assumed that this consists merely in turning the range crank 81 of range unit 23 until the lower extremity of the range step 82 coincides with the lower left-hand edge of the target indication 83 appearing on the horizontal trace of oscilloscope 14. The range crank 81 is geared with the counter 49 of unit 23 in such a way that when the range step 82 contacts the target indication 83 the range in yards of the target may be read on the counter. The turning of the crank 81 operates over the functional path 84 to cause range mark generator 44 to produce a pulse that is fed over path 85 to the vertical deflection plates of radar oscilloscope 14 and over path 86 to the intensity control grid of the acquisition oscilloscope 13. This pulse produced by range mark generator 44 is delayed with respect to the origin of the range sweep in each oscilloscope by an amount proportionate to the angular rotation of the range crank 81. In each case this delayed pulse from the range mark generator 44 produces a range indication along the horizontal sweep of the oscilloscope trace. In the case of the oscilloscope 14 it produces the step 83 and in the case of the oscilloscope 13 it produces, by virtue of the lobe switching displacement of the sweep origin hereinbefore described, the double line range mark 80. Thus the completion of the range determination of the target by the operation of the range unit 23 is signaled on the acquisition oscilloscope 13 by the alignment of the range marks 80 with the paired target indication 50, as well as on the oscilloscope 14 by the contact of range step 82 with target indication 83. All of the significant positional data with respect to the target are therefore presented on the screen of oscilloscope 13. At this time the bearing of the target may be read on indicator 79, its elevation upon indicator 78 and its range in yards upon counter 49.

At this stage in the operation the acquisition of the target is complete, and either the acquisition operator or the radar operator, if there are two, may throw the switch 25 from its search to its track position. The throwing of the switch from search to track effects several changes. One of these is to stop the nodding of the antenna and immediately center it at its nodding center and thus with the mean scanning axis of the beam in alignment with the pointing position of the guns 10 and the director 12. The antenna nodding ceases, but the axis of the beam 57 continues to rotate about the antenna axis 58. Another change effected by the throwing of switch 25 to its track position is to remove the control of director oscilloscope 15 from the bearing and elevation units 21 and 22 and place it directly under the control of the pointing voltages developed from the intermodulation in pointing demodulator 87 of waves from the two-phase generator 17 and target signals from the detector and video amplifier 36. These voltages cause a deviation of the spot 74 of oscilloscope 15 from its center corresponding in bearing and elevation with the deviation of the target from the antenna axis. When spot 74 is centered on the cross-hairs the target is centered on the antenna axis. Obviously, if the acquisition of the target in the search stage of operation had not been effected with the degree of accuracy made possible by the acquisition system described, the target when switch 25 is thrown over to track would be outside the narrow coverage of the centered, rotating beam, and no target signal would be received upon the director oscilloscope 15 for the guidance of the director operator during the final precision tracking of the target.

Briefly, to conclude the description of the operation, it may be stated that during the tracking stage the radar positional data including bearing and elevation of the target, range and rate of change in range, as well as various corrections such as wind, drift, and initial velocity loss in the projectile speed, are fed into the computer and gun sight control shown as the box 19 on the director 12, and that these data so modify the control relationships between the various elements that while the radar and optical line of sight remains on the target, the guns are so pointed as to cause the projectile to intersect the line of flight at a predetermined future position of the target. As suggested by the broken lines within the housing of the director 12, the radar image of the target as produced by oscilloscope 15 is superposed upon the optical image of the target as viewed through the telescope 20. But under the control of the device 19 the line of sight is disturbed by an amount that causes the operator mechanically to point the director 12, and therefore the guns 10, at the predetermined future position of the target in order to keep the optical and radar images of the target centered in the field of view. The control of the device 19 over the pointing of the antenna 11 in elevation and bearing, exercised over the functional control paths 90 and 91, is such that although the antenna is supported on the guns that are pointed at the future position of the target, the antenna 11 continues to point at the present position of the target. It may be added that the range of the target as indicated on counter 49 of unit 23 and the rate of change in range as indicated on the indicator 92 of that unit are conveyed to the computer 19 over the functional paths 93 and 94.

What is claimed is:

1. In a radar system, an antenna having a narrow angle directive beam of approximately circular cross-section adapted to rotate about an axis eccentric to the beam axis and lying within the beam cross-section, an oscilloscope provided with a screen and with means for translating electrical echoes received from targets by way of said directive beam into intensity signal indications on said screen, switching means for positioning the like signal indications resulting from target echoes received during corresponding half-rotations of said beam beside and parallel to the signal indications resulting from echoes received from the same target during opposite corresponding half-rotations of said beam to produce closely contiguous paired indications for each target, and means cooperating with the above recited elements whereby the position of a target with respect to the axis of beam rotation may be ascertained by comparing the relative magnitude and brightness of said indications.

2. A radar target acquisition organization comprising, means for generating a narrow angle directive beam of approximately circular cross-section, means for continuously rotating the axis of said beam rapidly about an axis eccentric to the beam axis and lying within the beam cross-section, means for oscillating said rotating beam continuously in one of the dimensions of bearing and elevation and at the same time progressively advancing said beam in the other dimension, an oscilloscope provided with a screen, means for distributing reflected energy echoes received by way of said beam over said oscilloscope screen as luminous intensity indications corresponding to the targets from which energy is reflected and for displacing the indications resulting from echoes returning from a target during one-half the rotation of the beam from the indications resulting from echoes returned from the target during the other half of the beam rotation, to form two closely spaced parallel lines, and means for distributing said parallel lines along a dimension of the screen normal to that of said displacements, whereby the positioning of target indications along one rectangular dimension of the screen corresponds to the location of the corresponding targets in one of the dimensions of bearing and elevation and the position of said lines in the other rectangular dimension of the screen indicates the range of the corresponding target, the equality of length and brightness of the two lines indicating coincidence in bearing of the target and said eccentric axis.

3. In a radar system, an antenna having a narrow angle directive beam of approximately circular cross-section, means for causing the axis of said beam to rotate about an axis eccentric to the beam axis and lying within the beam cross-section, means for causing the axis of rotation of said rotating beam to nod through a relatively wide angle, an oscilloscope provided with a screen and with means for translating electrical echoes received from targets by way of said directive beam into intensity signal indications on said screen, switching means for positioning the signal indications resulting from target echoes received during corresponding half-rotations of said beam beside the signal indications resulting from echoes received from the same target during opposite corresponding half-rotations to produce closely contiguous paired indications for each target, and means for distributing said paired indications along one dimension of said screen in accordance with the nodding angular position of the beam when different target signals are received.

4. In a radar system, an antenna having a narrow angle directive beam of approximately circular cross-section, means for causing the axis of said beam to rotate about an axis eccentric to the beam axis and lying within the beam cross-section, means for causing the axis of rotation of said beam to nod through a relatively wide angle, an oscilloscope provided with a screen and with means for translating electrical echoes received from targets by way of said directive beam into signal indications on said screen, switching means operating to displace along one rectangular dimension of the screen the signal indications resulting from target echoes received during corresponding half-rotations of said beam with respect to the signal indications resulting from echoes from the same target received during opposite corresponding half-rotations of said beam to produce closely contiguous paired indications for each target, and means for distributing said paired indications along the other rectangular dimension of the screen in accordance with the angle of nod of the beam when the corresponding echoes are received.

5. In a radar system, an antenna having a narrow angle directive beam of approximately circular cross-section, means for causing the axis of said beam to rotate about an axis eccentric to the beam axis and lying within the beam cross-section, means for causing the axis of rotation of said beam to nod through a relatively wide angle, means for causing said nodding and rotating beam, to advance in a plane transverse to the nodding plane of said beam, an oscilloscope provided with a screen and with means for translating electrical echoes received from targets by way of said directive beam into intensity signal indications on said screen, switching means for displacing along one rectangular dimension of the screen the signal indications resulting from echoes received from a target during corresponding half-rotations of said beam with respect to the signal indications resulting from echoes received from the same target during opposite corresponding half-rotations of said beam to produce closely contiguous paired indications for each target, and means for causing distribution of the paired indications along the other rectangular dimension of the screen in accordance with the angle of nod of the beam when the corresponding echoes are received, so that the relative magnitudes and brightnesses of the two component indications of each pair with respect to each other change with said progressive advance of said nodding and rotating beam, and equality of magnitude and brightness of the two components of the paired indications on the screen indicate the position of the target in the dimension of the progressive advance.

6. In a radar system having a continuously rotating and nodding narrow angle directive beam, means for causing the movement of said nodding, rotating beam in a direction transverse to the direction of nod, an oscilloscope provided with a screen and with means for translating electrical echoes received from targets by way of said directive beam into intensity signal indications and distributing said indications over the surface of said screen, switching means for causing transversely opposite half-rotations of said beam and for producing closely contiguous paired indications on said screen for each target, and means cooperating with the above recited elements whereby the position of each of said paired indications with respect to one rectangular dimension of the screen indicating the range of the target, the position of each paired indication with respect to the other rectangular dimension of the screen indicating the nodding angle of the beam at which the target lines, and equality in length and brightness of the two indications of the pair indicating the position of the target with respect to the transverse angular position of the nodding and rotating beam.

7. A radar target location system comprising a scanning beam and an oscilloscope, means for producing on the screen of said oscilloscope a variety of identical indications for each target as its position changes with relation to the scanning field, said signals consisting of closely contiguous paired identical indications for said target when the target is in the central area of the scanning field and identical single indications when the same target is in the outlying regions of the scanning field, and color differentiation means for producing a visual differentiation between the single indications produced by said target on opposite sides of the central area of the scanning field, whereby the position of the target with respect to the central area of the scanning field is immediately apparent to the eye.

8. In a radar target location system, comprising an oscilloscope and antenna means for projecting into an exploratory area a rapid succession of energy pulses each of which produces an energy echo from a target upon which the pulses impinge, means for projecting said pulses in the form of a beam that continuously oscillates between two angular positions with respect to the antenna axis, means for causing the echoes from said target to produce identical signal indications on the oscilloscope screen, and means operating to interpose between the eye and the screen a color filter during the instants when the beam is in one only of its two angular positions for differentiating between the appearance of the signal indication originating in a target lying within one angular position of the beam and the appearance of the signal indication originating in the same target lying within the opposite angular position of said beam.

9. A radar target locating system comprising means for producing two identical indications on the same oscilloscope screen for the same target, each of said indications however giving the range of the target and positional information with respect to the target different from the positional information given by the other indication, a movable light filter, and means for interposing said light filter between the screen and the eye during the production of one only of said indications.

ELMO E. CRUMP.

References Cited in the file of this patent

UNITED STATES PATENTS

| Number | Name | Date |
|---|---|---|
| 2,083,242 | Runge | June 8, 1937 |
| 2,399,426 | Bradley | Apr. 30, 1946 |
| 2,403,562 | Smith | July 9, 1946 |
| 2,405,930 | Goldberg | Aug. 13, 1946 |
| 2,408,848 | Hammond | Oct. 8, 1946 |
| 2,409,448 | Rost et al. | Oct. 15, 1946 |
| 2,412,702 | Wolff | Dec. 17, 1946 |
| 2,412,703 | Wolff | Dec. 17, 1946 |
| 2,417,248 | Godet | Mar. 11, 1947 |
| 2,419,567 | Labin | Apr. 19, 1947 |
| 2,422,361 | Miller | June 17, 1947 |
| 2,426,218 | Hopgood | Aug. 26, 1947 |
| 2,426,979 | Ayres | Sept. 9, 1947 |
| 2,428,351 | Ayres | Oct. 7, 1947 |
| 2,432,330 | Norgaard | Dec. 9, 1947 |
| 2,437,286 | Witt | Mar. 9, 1948 |
| 2,446,024 | Porter | July 27, 1948 |
| 2,449,976 | Busignies | Sept. 28, 1948 |
| 2,468,714 | Leverenz | Apr. 26, 1949 |
| 2,470,939 | Miller | May 24, 1949 |
| 2,471,264 | Doherty | May 24, 1949 |
| 2,483,432 | Richardson | Oct. 4, 1949 |
| 2,501,748 | Streeter | Mar. 28, 1950 |
| 2,508,358 | Ayres | May 23, 1950 |
| 2,513,962 | Patterson | July 4, 1950 |
| 2,514,828 | Ayres | July 11, 1950 |
| 2,540,121 | Jenks | Feb. 6, 1951 |
| 2,541,030 | Busignies | Feb. 13, 1951 |
| 2,543,753 | Ayres | Mar. 6, 1951 |

FOREIGN PATENTS

| Number | Country | Date |
|---|---|---|
| 555,052 | Great Britain | Aug. 3, 1943 |